(12) United States Patent
Wengerter et al.

(10) Patent No.: US 7,877,108 B2
(45) Date of Patent: *Jan. 25, 2011

(54) TRANSMISSION POWER RANGE SETTING DURING CHANNEL ASSIGNMENT FOR INTERFERENCE BALANCING IN A CELLULAR WIRELESS COMMUNICATION SYSTEM

(75) Inventors: Christian Wengerter, Kleinheubach (DE); Alexander Golitschek Edler Von Elbwart, Darmstadt (DE)

(73) Assignee: Panasonic Corporation, Osaka (JP)

( * ) Notice: Subject to any disclaimer, the term of this patent is extended or adjusted under 35 U.S.C. 154(b) by 1078 days.

This patent is subject to a terminal disclaimer.

(21) Appl. No.: 10/578,262

(22) PCT Filed: Nov. 5, 2004

(86) PCT No.: PCT/EP2004/012561

§ 371 (c)(1),
(2), (4) Date: Oct. 4, 2006

(87) PCT Pub. No.: WO2005/046274

PCT Pub. Date: May 19, 2005

(65) Prior Publication Data

US 2007/0060062 A1 Mar. 15, 2007

(30) Foreign Application Priority Data

Nov. 6, 2003 (EP) .................................. 03025479

(51) Int. Cl.
*H04W 40/00* (2009.01)
*H04W 72/00* (2009.01)
*H04B 15/00* (2006.01)
*H04B 1/00* (2006.01)
*H04B 17/00* (2006.01)

(52) U.S. Cl. ..................... 455/522; 455/446; 455/447; 455/450; 455/464; 455/505; 455/453; 455/448; 455/449; 455/62

(58) Field of Classification Search ......... 455/446–450, 455/464, 505, 62
See application file for complete search history.

(56) References Cited

U.S. PATENT DOCUMENTS 5,579,373 A * 11/1996 Jang .......................... 455/436

(Continued)

OTHER PUBLICATIONS

European Search Report dated Apr. 1, 2004.

(Continued)

*Primary Examiner*—Matthew D Anderson
*Assistant Examiner*—Bobbak Safaipour
(74) *Attorney, Agent, or Firm*—Dickinson Wright PLLC

(57) ABSTRACT

The present invention relates to a method for balancing the distribution of interference between radio cells in a wireless communication system comprising cells in which subcarrier blocks are used for communication. A number of adjacent cells build a cell cluster. Moreover, the present invention relates to a corresponding method adapted for use in a system in which multi beam antennas or multiple antennas are used. Furthermore, the present invention relates to base stations performing the above method as well as a communication system comprising the base stations. To reduce the large average SIR variations without causing additional SIR estimation, measurement and calculation problem as introduced with power control the invention suggests to group subcarrier blocks into a plurality of subcarrier block sets in each cell of a cell cluster, to determine transmission power ranges for each of the cells of said cell cluster, and to assign transmission power ranges to the subcarrier block sets to perform TPC within the ranges.

28 Claims, 9 Drawing Sheets

U.S. PATENT DOCUMENTS

| | | | |
|---|---|---|---|
| 6,047,186 A * | 4/2000 | Yu et al. | 455/446 |
| 6,400,697 B1 * | 6/2002 | Leung et al. | 370/328 |
| 6,549,782 B2 * | 4/2003 | Roy | 455/450 |
| 6,882,847 B2 * | 4/2005 | Craig et al. | 455/450 |
| 6,914,557 B2 * | 7/2005 | Chang et al. | 342/354 |
| 6,965,774 B1 * | 11/2005 | Kasapi et al. | 455/450 |
| 6,973,314 B2 * | 12/2005 | Wilson et al. | 455/452.1 |
| 7,136,620 B2 * | 11/2006 | Wang | 455/13.1 |
| 7,187,949 B2 * | 3/2007 | Chang et al. | 455/562.1 |
| 7,299,073 B2 * | 11/2007 | Wilson et al. | 455/562.1 |
| 7,450,914 B2 * | 11/2008 | Valdivia et al. | 455/121 |
| 7,561,882 B2 * | 7/2009 | Kasapi et al. | 455/450 |
| 7,627,284 B2 * | 12/2009 | Wang | 455/13.1 |

OTHER PUBLICATIONS

H. Rohling, et al.; "Performance of an OFDM-TDMA Mobile Communication System" Institute of Telecommunications, Technical University Braunschweig, Braunschwieg, Germany, 1996, pp. 1589-1593.

PCT International Search Report dated Feb. 17, 2005.

Ishii K. et al.: "An effective integration of dynamic channel allocation with transmitting power control." Global Telecommunications Conference, 1996, Globecom '96. 'Communications: The Key to Global Prosperity London, UK Nov. 18-22, 1996, New York, NY, USA, IEEE, US. Nov. 18, 1996, pp. 247-251, XP010220359, ISBN: 0-7803-3336-5.

Duk-Kyu Park, et al.; "A new channel assignment by controlling the transmitted power level based on the distance between the cell site and the mobile unit," Vehicular Technology Conference, 1994 IEEE 44TH Stockholm, Sweden Jun. 8-10, 1994, New York, NY, USA, IEEE, Jun. 8, 1994, pp. 863-867, XP010123197, ISBN: 0-7803-1927-3.

* cited by examiner example 1 example 2

TRANSMISSION POWER RANGE SETTING DURING CHANNEL ASSIGNMENT FOR INTERFERENCE BALANCING IN A CELLULAR WIRELESS COMMUNICATION SYSTEM

FIELD OF THE INVENTION

The present invention relates to a method for balancing the distribution of interference between radio cells in a wireless communication system. The system comprises a plurality of radio cells in which a plurality of subcarrier blocks is used for communication, wherein each subcarrier block comprises a plurality of subcarriers. Further, a number of adjacent radio cells build a cell cluster. Moreover, the present invention relates to a corresponding method adapted for use in a system in which sectorized base stations are used. Furthermore, the present invention relates to base stations performing the above method as well as a communication system comprising the base stations.

BACKGROUND ART

In modern packet-based cellular mobile communication systems, Dynamic Channel Assignment (DCA) schemes are popular, since they are an efficient tool to increase the (air interface) system throughput. DCA schemes utilize the short term fluctuations (fast fading) of the channel quality of the links between base stations (BS) and mobile stations (MS). In such a system a so-called scheduler (usually part of the base station) tries to assign system resources preferably to mobile stations in favorable channel conditions.

In time domain DCA works on a frame-by-frame basis, where a frame duration is typically in the (sub-)millisecond region. Furthermore—depending on the multiple access scheme—the air interface resources are divided in e.g. code and/or frequency domain.

The following description concentrates on downlink scenarios (BS transmits to MS), however without loss of generality, DCA can also be applied to the uplink (MS transmits to BS). In any case, the scheduler performing the DCA needs to have detailed channel knowledge of the BS-MS links, which is gathered by channel estimation. If the scheduler is located in the network and the measurement is performed in the MS, the channel information is signaled from MS to BS. It is important, that the channel quality is measured on a instantaneous basis in order to reflect the instantaneous received signal power and the instantaneous interference.

In Frequency Division Multiple Access (FDMA) systems, DCA is performed in time-frequency domain, since physical layer channels are defined in frequency domain. Typically, the channel quality varies significantly in frequency domain (frequency selective fading). Hence, depending on the conditions of the channels over all available frequencies and all active mobile stations, the scheduler can assign the channels dynamically at each scheduling instant to specific BS-MS links.

In an OFDMA (Orthogonal Frequency Division Multiple Access) system, the frequency resource is partitioned into narrowband subcarriers, which typically experience flat fading. Here, generally the scheduler dynamically assigns subcarrier blocks (containing M adjacent or separated subcarriers) to a specific MS in order to utilize favorable channel conditions on a link. Example of such a system is known from Rohling et al., "Performance of an OFDM-TDMA mobile communication system", IEEE Proceedings on the Conference on Vehicular Technology (VTC 1996), Atlanta, 1996.

In case of a CDMA (Code Division Multiple Access) the system resources are defined in code domain and, therefore, the scheduler dynamically assigns codes to specific BS-MS links. Note, that in contrast to FDMA, for a given link the channel quality is similar for all resources/codes (fading is not code selective) and, hence, in code domain the DCA is performed with respect to the number of codes to assign to a specific MS and not which codes to assign. The DCA is focused on the time domain scheduling utilizing the fast fading characteristics. HSDPA (High Speed Downlink Packet Access) within the 3GPP ($3^{rd}$ Generation Partnership Project) standard is such a CDMA system employing DCA.

A MC-CDMA (Multi-Carrier CDMA) system can be considered as a combination of CDMA and (O)FDMA. Hence, DCA can be performed as well in code as in frequency domain.

Generally, the DCA throughput efficiency increases with the number of active mobile stations in a cell, since this increases the number of links in good channel conditions and, therefore, increases the probability that a channel in favorable conditions is scheduled (multi-user diversity).

Typically, DCA is combined with link adaptation techniques such as Adaptive Modulation and Coding (AMC) and hybrid Automatic Repeat reQuest (ARQ).

Furthermore, DCA can be combined with power control schemes, where the power assigned to a specific channel (in code, frequency domain) is controlled in order to compensate the channel power variations and/or to support the AMC operation.

Properties of Non-Power Controlled Systems

As described in the previous section, for efficient DCA operation the scheduler in the BS when assuming a non-power controlled system needs detailed knowledge on the instantaneous quality of all channels over all available subcarrier blocks and all involved BS-MS links.

Considering a DCA OFDMA multi-cell scenario and a frequency re-use factor of 1, the system is typically interference limited. I.e. the channel quality per subcarrier block is primarily defined by the signal (S) to interference (I) ratio (SIR), where the interference is dominated by the intercell-interference (co-channel interference) caused by the transmissions on the respective channel (subcarrier block) in adjacent cells (C denotes the set of adjacent cells):

$$ChannelQuality \approx SIR = \frac{S}{I} \approx \frac{S}{\sum_c I_c} \quad (1)$$

In case of an OFDMA system with DCA and frequency selective fading, the instantaneous SIR(t) for a given link to a mobile station m varies over the subcarrier blocks b, since both the signal and the interference experience fading:

$$SIR_b^m(t) = \frac{S_b^m(t)}{I_b^m(t)} \approx \frac{S_b^m(t)}{\sum_c (I_b^m(t))_c} \quad (2)$$

As mentioned earlier, the performance of a system employing DCA and AMC greatly depends on the accuracy of the SIR estimation. Therefore, according to equation (2) the following problems occur.

All values in equation (2) experience fast fading and will change between the point in time of the measurement and the point in time of the actual transmission (after performing DCA and AMC selection). This delay causes inaccurate DCA and AMC operation. The delay even increases, if the measurement is performed at the MS and needs to be fed back by signaling to the BS.

The number of interferers in the denominator depends on the actual usage (allocation) of the subcarrier block in the adjacent cells. I.e. depending on the actual load in the adjacent cells some subcarrier blocks might not be used. Generally, at the point in time of the measurement, the usage of subcarrier block at the point in time of the transmission is unknown in adjacent cells due to the following reasons:

The channel quality measurement is performed based on an outdated interference caused by the subcarrier block allocation (scheduling) in the adjacent cells (measurement for the n-th frame is performed at the (n−k)-th frame, where the subcarrier allocation is most likely different).

Further, there exists the so-called chicken-and-egg allocation problem: In cell A, the subcarrier block allocation and AMC can only be performed after the SIR measurement/calculation in cell A has been performed, which requires knowledge of the subcarrier block allocation in cell B (adjacent cells). However, before the subcarrier block allocation in cell B can be performed the SIR measurement/calculation in cell B needs to be performed, which requires the knowledge of the subcarrier block allocation in cell A.

In case the chicken-and-egg problem may be avoided/solved by e.g. an iterative process, signaling of e.g. the allocation status between base stations would be required. However, since the scheduling frames are in the millisecond region, the signaling would introduce additional significant delay.

Additionally, without any power control, the average SIR (neglecting fast fading influences) for a BS-MS link strongly depends on the geometry (e.g. distance to BS) of the MS causing the following effects:

With increasing distance between BS and MS, the SIR for the respective links decreases, since the average received signal power decreases and the average received interference power increases. This translates in a significantly lower achievable data rate per subcarrier-block for links to mobile stations in low geometry.

The difference in average SIR can be on the order of tens of dB, which requires a large dynamic range for the AMC scheme definition. This leads to an increased amount of signaling, since the required number of combinations of modulation schemes and code rates increases when keeping the AMC granularity with respect to smaller dynamic ranges Compared to power controlled systems, for non-power controlled systems it is more likely that multilevel modulation schemes (e.g. 8-PSK, 16-QAM, 64-QAM, etc) are chosen for links to mobile stations in high geometry. Although, this increases the available throughput for those mobile stations, it can decrease the overall system throughput compared to a system, where the available power is distributed such that only non-multilevel modulation schemes (e.g. QPSK) are used. This is caused by the reduced power efficiency of multilevel modulation schemes.

Compared to power controlled systems, for non-power controlled systems it is more likely that mobile stations in low geometry cannot receive any data with single transmission attempts, but would need several retransmissions. Therefore, the average number of transmissions (ARQ retransmissions) increases, which in turn increases the transmission delay and feedback signaling, as well as decreasing the bandwidth efficiency.

Data transmission to mobile stations in high geometry is burstier in the time domain, since on average higher modulation and coding schemes can be selected. This results in a burstier subcarrier block allocation. This will make the SIR estimation according to equation (2) more difficult, since the subcarrier block allocation changes more often.

Properties of Power Controlled Systems

DCA and AMC can also be combined with Power Control (PC) schemes. Employing PC the system tries to compensate fluctuations of the received signal power due to the signal path loss, shadowing effects (slow fading) and or fast fading effects. Generally, PC schemes can be classified into two categories: Fast PC and slow PC.

In contrast to systems without PC, for slow PC systems the average SIR does not depend on the geometry of the mobile stations, assuming only slow fading effects and unlimited minimum and maximum transmit power. Hence, the achievable data rates per subcarrier block do not depend on the MS position. Note however, the slow PC can only operate within certain limits (dynamic range of the control commands), i.e. the power compensation might not be sufficient or fast enough for any link.

Fast power control is usually performed jointly with the AMC in order to adapt the transmission rate to short term fluctuations and in order to optimize the overall power usage.

With slow/fast PC the instantaneous SIR estimation/measurement/calculation problem as outlined in the previous sections above, is more severe compared to the non-PC case. That is, the unknown number of interference components of the sum in the denominator equation (2) do not only experience fast fading, but significantly vary in amplitude due to the PC in adjacent cells. I.e. the intercell-interference on a given subcarrier block from a given adjacent cell can vary from frame to frame in tens of dB depending on which MS is scheduled on the respective subcarrier block, since the transmitted power might vary significantly depending primarily on the MS location. This is especially critical, if the interference is dominated by few interferers, since there is no interference averaging effect.

SUMMARY OF THE INVENTION

One object of the present invention is to reduce the large intercell interference fluctuations caused by power control schemes.

The object is solved by the subject matter of the independent claims. The different embodiments of the present invention are subject matters of the dependent claims.

In more detail, the present invention provides a method for balancing the distribution of interference between radio cells in a wireless communication system. The system may comprise a plurality of radio cells in which a plurality of subcarrier blocks is used for communication. Each subcarrier block may comprise a plurality of subcarriers and a number of adjacent radio cells may build a cell cluster. Further, it should be noted that the term "subcarrier block" may also be understood as a (physical layer) channel in a FDM (Frequency Division Multiplex) based communication system, e.g. in case the number of subcarriers of a subcarrier block is equal to one.

According to the method the subcarrier blocks may be grouped into a plurality of subcarrier block sets (SBSs) in each radio cell of the cell cluster. Further, a plurality of transmission power ranges may be determined for each of the radio cells of the cell cluster, wherein a transmission power range defines a range of transmission power levels used for transmission power control, and the plurality of transmission power ranges may be assigned to the subcarrier block sets of radio cells of the cell cluster. It is noted that according to this embodiment, the number of transmission power ranges and subcarrier block sets are independent of one another, i.e. same do not necessarily have to be of same number. According to a further embodiment, the radio cells of the cell cluster may each comprise corresponding subcarrier block sets having the same subcarriers.

More specifically, a transmission power range as mentioned above may define a range of transmission power levels used to power control of a communication channel (subcarrier block) to a mobile communication terminal, i.e. when choosing a subcarrier block for communication, only a predetermined transmission power level range of the subcarrier block set to which the respective subcarrier block belongs to may be used for power control.

The plurality transmission power ranges may be assigned to the subcarrier block sets of radio cells of the cell cluster, such that in a single radio cell, there is a mapping of each of the plurality of transmission power ranges to a subcarrier block set of the single radio cell, and there is a mapping of each of the plurality of transmission power ranges to one of the corresponding subcarrier block sets in the radio cells of the cell cluster. This rule for the distribution of power ranges may be especially applicable in situations in which the number of available transmission power ranges is chosen to be large or equal to the number of subcarrier block sets.

Further, the plurality transmission power ranges may be assigned to the subcarrier block sets of radio cells of the cell cluster, such that in a single radio cell, there is a mapping of each of the plurality of subcarrier block sets of the single radio cell to a transmission power range, and there is a mapping of each of the corresponding subcarrier block sets in the radio cells of the cell cluster to one of the plurality of transmission power ranges. In contrast to the distribution rule exemplary mentioned above, this rule for the distribution of power ranges may be especially applicable in situations in which the number of available subcarrier block sets is chosen to be larger or equal to the number of transmission power ranges.

According to another embodiment, the mapping used in the two above mentioned assignment rules is a unique or one-to-one mapping. This means that e.g. when mapping the transmission power ranges to subcarrier block sets, each of the transmission power ranges is mapped to a corresponding single subcarrier block set. If the subcarrier block sets are mapped to the transmission power ranges, each subcarrier block set is mapped to a corresponding single transmission power range.

To simplify the distribution of transmission power ranges and subcarrier block sets, their number may be determined based on the number of radio cells forming a cell cluster.

Hence, in a further embodiment, the present invention provides a method for balancing the distribution of interference between radio cells in a wireless communication system, comprising a plurality of radio cells in which a plurality of subcarrier blocks is used for communication, wherein each subcarrier block comprises a plurality of subcarriers. Further, N adjacent radio cells may build a cell cluster, wherein N is an integer number of 2 or more.

According to this embodiment of the present invention the subcarrier blocks may be grouped into N subcarrier block sets in each radio cell of the cell cluster, wherein the radio cells of the cell cluster each comprise corresponding subcarrier block sets having the same subcarriers. Hence, the number of subcarrier block sets corresponds to the number of radio cells in a cluster in this embodiment. Further, N transmission power ranges may be determined for each of the radio cells of the cell cluster, wherein a transmission power range defines a range of transmission power levels used for transmission power control, and the N transmission power ranges may be assigned to the N subcarrier block sets of radio cells of the cell cluster, such that each of the N transmission power ranges in a radio cell is assigned to one of the N subcarrier block sets of the radio cell, and each of the N transmission power ranges is assigned to one subcarrier block set of corresponding subcarrier block sets.

When choosing the number of cells in a cell cluster, the number of subcarrier block sets and the number of transmission power ranges as proposed in this embodiment the general distribution rules as defined above may be significantly simplified.

Another embodiment of the present invention relates to a system in which the number of transmission power ranges and subcarrier block sets are each integer multiples of the number of radio cells in a cell cluster. This embodiment also provides a method for balancing the distribution of interference between radio cells in a wireless communication system. Again the system may comprise a plurality of radio cells in which a plurality of subcarrier blocks is used for communication, wherein each subcarrier block may comprise a plurality of subcarriers. N adjacent radio cells may build a cell cluster, wherein N may be an integer number of 2 or more.

According to the method, the subcarrier blocks may be grouped into x·N subcarrier block sets in each radio cell of the cell cluster, wherein the radio cells of the cell cluster each comprise corresponding subcarrier block sets having the same subcarriers. x represents an integer number of 1 or more. Further, y·N transmission power ranges may be determined for each of the radio cells of the cell cluster, wherein a transmission power range defines a range of transmission power levels used for transmission power control, and wherein y is an integer number of 1 ore more.

Next, the y·N transmission power ranges may be assigned to the x·N subcarrier block sets of radio cells of the cell cluster, such that each of the y·N transmission power ranges in a radio cell is assigned to one of the x·N subcarrier block sets of the radio cell, and y/x transmission power ranges on average are assigned to one subcarrier block set of corresponding subcarrier block sets.

It is noted that the ratio y/x may also result in an non-integer number depending on the choice of the parameters x and y. Obviously, it is not possible to assign half of a transmission power range to a subcarrier block set. However, it is possible to distribute an integer number of power ranges to subcarrier block sets in that different quantities of power ranges are assigned to each of the subcarrier block sets such that on average the ratio of y/x power ranges is assigned.

It is further noted that the different embodiments of the method for balancing the interference in a wireless communication system outlined above should not be understood as restricting the power ranges in the different cells of a cell cluster to identical power ranges. The individual power ranges in each radio cell of a cell cluster may be identical or may be different from each other. This is of advantage to be able to adapt to e.g. the respective channel conditions and/or cell-sizes in the different cells.

In all embodiments above, the method may further comprise the steps of measuring the path loss of a communication signal of a communication terminal and the path loss of the interference from adjacent cells. The embodiments above may further comprise the assignment of the communication terminal to at least one subcarrier block of one of the subcarrier block sets based on the measurement.

A transmission power range for the communication terminal may be determined based on the above mentioned measurement, and the communication terminal may be assigned to at least one subcarrier block set based on the determined transmission power range.

It should be noted that the actual channel assignment may be carried out onto a subcarrier block. In this context, the assignment to a subcarrier block set may be regarded as a pre-selection.

In an alternative embodiment, it may also be considered to assign a block set to a communication terminal first and to choose the respective transmission power level based on the assignment. Hence, the transmission power range may be determined based on the assigned block set.

The transmission power range of the assigned subcarrier block set may be chosen based on the ratio of the measured signal path loss and the measured interference path loss. Consequently, for a communication terminal that is located close to a base station of a radio cell the measurement results may indicate that a transmission power range comprising low transmission power levels may be sufficient for a communication between the communication terminal and the base station. In contrast, for a communication terminal that is located near to the cell boundaries of a radio cell the measurement results may indicate an accordingly transmission power range comprising large transmission power levels may be required for a communication between the communication terminal and the base station.

Further, it should be noted the channel quality fluctuations may be countered by changing the transmission power level within the allowed power range for the respective subcarrier block set, by changing the transmit power range (i.e. changing the subcarrier block set), or by performing link adaptation by changing the modulation and coding scheme.

It is of further advantage, if the transmission power ranges in different radio cells of a cell cluster vary, such that same may be adapted to the respective channel conditions in each of the radio cells of the cell cluster.

Further, the transmission power ranges in a radio cell may vary between the radio cells. As explained above, this allows individual control of the transmission power ranges in each of the cells to adapt same to changing channel quality conditions in the respective cell.

To be able to adapt to changing channel quality conditions also the subcarrier block sets in a radio cell may be reconfigured. For the same reason as above also the transmission power ranges in a radio cell may be reconfigured.

The reconfiguration of the power ranges and/or the subcarrier block sets in the radio cell may be performed in accordance with the other radio cells of its cell cluster. The reconfiguration may be based on channel quality measurements in the radio cell and/or the other radio cells of its cell cluster.

Further, information related to a reconfiguration of the subcarrier block sets in a radio cell may be signaled from the radio cell to the other radio cells of its cell cluster or may be signaled from a control unit (e.g. radio network controller) to the radio cells forming a cell cluster.

According to a further embodiment of the present invention also information related to channel qualities in a radio cell may be signaled from the radio cell to the other radio cells of its cell cluster. By signaling the channel qualities in a radio cell to adjacent radio cells, same may include the information when reconfiguring the transmission power ranges or subcarrier block sets in the respective radio cell.

The main idea underlying the present invention may also be applicable to systems in which radio cells are divided into sectors, i.e. to systems using multi-beam antennas or multiple antennas. Employing this layout, a single cell may be divided in a plurality of sectors each covered by an antenna beam.

According to another embodiment, the present invention therefore provides a method for balancing the distribution of interference between radio cells in a wireless communication system. The system may comprise a plurality of radio cells each of them comprising at least two sectors, wherein in each sector a plurality of subcarrier blocks is used for communication. Each subcarrier block may comprise a plurality of subcarriers, and a number of adjacent radio cells build a cell cluster.

The subcarrier blocks may be grouped into a plurality of subcarrier block sets in each of the sectors of each radio cell of the cluster. A plurality of transmission power ranges may be determined for each sector of each radio cell of the cell cluster, wherein a transmission power range defines a range of transmission power levels used for transmission power control. Next, the plurality of transmission power ranges may be assigned to the plurality of subcarrier block sets of a sector of a radio cell and its adjacent sectors of the other radio cells. In another embodiment, each sector of a radio cell may have adjacent sectors in the other radio cells of the cell cluster. Further, a sector of a radio cell and its adjacent sectors belonging to other radio cells may build a sector cluster and each may comprise corresponding subcarrier block set having the same subcarriers.

The plurality of transmission power ranges may be assigned to the subcarrier block sets of radio cells of the cell cluster, such that in a single sector of a radio cell, there is a mapping of each of the plurality of transmission power ranges to a subcarrier block set of the sector, and there is a mapping of each of the plurality of transmission power ranges to one of the corresponding subcarrier block sets in the sector cluster.

Alternatively, the plurality of transmission power ranges may be assigned to the subcarrier block sets of radio cells of the cell cluster, such that in a single sector of a radio cell, there is a mapping of each of the plurality of subcarrier block sets of the sector to a transmission power range, and there is a mapping of each of the plurality of the corresponding subcarrier block sets in the sector cluster to one transmission power range.

As outlined above, the mapping may be a unique or one-to-one mapping.

To simplify the distribution of transmission power ranges and subcarrier block sets, their number may be determined in relation to the number of radio cells forming a cell cluster. Hence, in a further embodiment, the present invention provides a method for balancing the distribution of interference between radio cells in a wireless communication system. The system may comprise a plurality of radio cells each of them comprising at least two sectors, wherein in each sector a plurality of subcarrier blocks is used for communication, wherein each subcarrier block comprises a plurality of subcarriers. A number of adjacent radio cells may build a cell cluster.

The subcarrier blocks may be grouped into N subcarrier block sets in each of the sectors of each radio cell of the cluster, wherein each sector of a radio cell has N−1 adjacent sectors in the other radio cells of the cell cluster, and wherein a sector of a radio cell and its adjacent sectors in the other radio cells each comprise corresponding subcarrier block set having the same subcarriers and wherein N may be an integer number of 2 or more. Further, N transmission power ranges may be determined for each sector of each radio cell of the cell cluster, wherein a transmission power range defines a range of transmission power levels used for transmission power control. The N transmission power ranges may be assigned to the N subcarrier block sets of a sector of a radio cell and its adjacent sectors of the other radio cells, such that in a sector, each of the N transmission power ranges In a sector of a radio cell is assigned to one of the N subcarrier block sets of the sector, and each of the N transmission power ranges is assigned to one subcarrier block set of corresponding sectors.

Another embodiment of the present invention relates to a system in which the number of transmission power ranges and subcarrier block sets are each integer multiples of the number of radio cells in a cell cluster. This embodiment also provides a method for balancing the distribution of interference between radio cells in a wireless communication system. Again, the system may comprise a plurality of radio cells each of them comprising at least two sectors, wherein in each sector a plurality of subcarrier blocks is used for communication, wherein each subcarrier block comprises a plurality of subcarriers. A number of adjacent radio cells may build a cell cluster.

In this embodiment, the subcarrier blocks may be grouped into x·N subcarrier block sets in each of the sectors of each radio cell of the cluster, wherein each sector of a radio cell has N−1 adjacent sectors in the other radio cells of the cell cluster, and wherein a sector of a radio cell and its adjacent sectors in the other radio cells each comprise corresponding subcarrier block set having the same subcarriers. x may be an integer number of 1 ore more and N may be an integer number of 2 or more.

Further, y·N transmission power ranges may be determined for each sector of each radio cell of the cell cluster, wherein y may be an integer number of 1 ore more.

The y·N transmission power ranges may be assigned to the x·N subcarrier block sets of a sector of a radio cell and its adjacent sectors of the other radio cells, such that in a sector, each of the y·N transmission power ranges in a sector of a radio cell is assigned to one of the x·N subcarrier block sets of the sector, and y/x transmission power ranges on average are assigned to one subcarrier block set of corresponding sectors.

The communication system may further comprise a plurality of communication terminals communicating with base stations associated to the plurality of radio cells. The path loss of a communication signal of a communication terminal and the path loss due to interference from adjacent sectors for the communication signal may be measured e.g. at a base station, and the communication terminal may be assigned to a subcarrier block of a subcarrier block set in a sector based on the measurement.

In a further step a transmission power range for the communication terminal may be determined based on the measurement, and the communication terminal may be assigned to a block set based on the determined transmission power range.

According to another embodiment, it may also be considered to assign a block set to a communication terminal first and to choose the respective transmission power level based on the assignment. Hence, the transmission power range may be determined based on the assigned block set.

The transmission power ranges in different sectors may vary as well as the transmission power ranges in sectors of a radio cell.

Independent of the use of single or multi-beam antennas, the subcarrier block set size in corresponding subcarrier block sets may be equal, i.e. each of the subcarrier block sets comprises the same number of subcarrier blocks and/or subcarriers.

Further, the subcarrier block sets may be reconfigured in a sector of radio cell. Same applies to the transmission power ranges of a sector as well.

The reconfiguration of the power ranges and/or the subcarrier block sets in the sector may be performed in accordance with the other sectors of its sector cluster. Further, the reconfiguration may be based on channel quality measurements in the sector and/or the other sectors of its sector cluster.

In the context of reconfiguration, information related to a reconfiguration of the subcarrier block sets in a sector may be signaled from its radio cell to radio cells comprising sectors of the sector cluster. Also, information related to channel qualities in a sector may be signaled from its radio cell to radio cells comprising sectors of the sector cluster.

Independent from the system architecture, i.e. the usage of sectorized radio cells or not, the information related to the reconfiguration of power levels or subcarrier block sets may be signaled to a control unit in the communication system. Taking the example of the Release 99/415 UTRAN (UMTS Terrestrial Radio Access Network) architecture, such a control unit may be a radio network controller (RNC) or, in the evolved architecture an functional enhanced Node B, the Node B+.

Further, also independent from the system architecture, information related to a subcarrier block assignment and/or a subcarrier block set assignment may be signaled to a communication terminal.

The communication terminal may further comprise receiving means for receiving information indicating a subcarrier block assignment and/or a subcarrier block set assignment, and selection means for selecting the signaled assigned subcarrier block and/or signaled assigned subcarrier block set for data transmission.

All the different embodiments of the inventive method for balancing the co-channel interference in radio cells may be advantageously used in a base station. The base station may be equipped with the respective means for performing the different method steps according to the different embodiments of method as outlined above.

Further, the present invention provides a communication terminal adapted for its operation in the above described communication systems. In the communication terminal a power control means may be adapted to perform power control in a transmission power control range in an interval defined by a transmission power level of 0 and a maximum transmission power level.

The present invention also provides radio communication system comprising a base station adapted to carry out the method according to the different embodiments and at least one communication terminal and the communication terminal described above.

BRIEF DESCRIPTION OF THE DRAWINGS

In the following the present invention is described in more detail in reference to the attached figures and drawings. Similar or corresponding details in the figures are marked with the same reference numerals.

DETAILED DESCRIPTION

In the following the present invention will be described with regard to wireless communication system using OFDM. Though the examples relate to OFDM, it should be noted that the ideas underlying the present invention may be readily applied to other FDM based communication systems as well.

Figure 1:
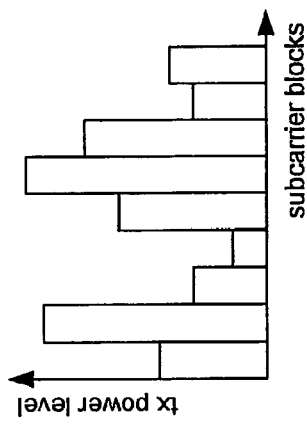
FIG. 1 shows a transmission power distribution for subcarrier blocks according to the prior-art.
Figure 4:
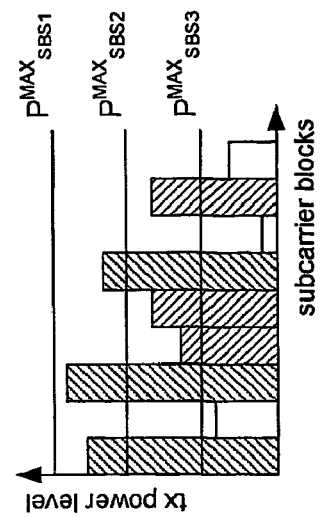
FIGS. 2, 3 & 4 show three examples for a transmission power distribution for subcarrier blocks according to an embodiment of the present invention.
Figure 3:
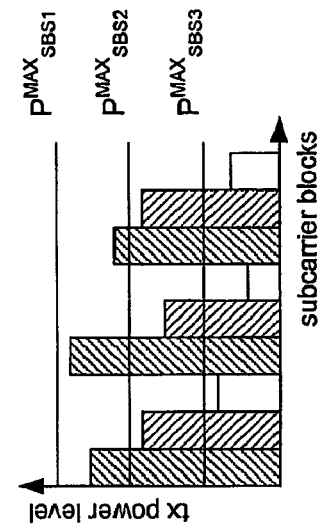
Figure 2:
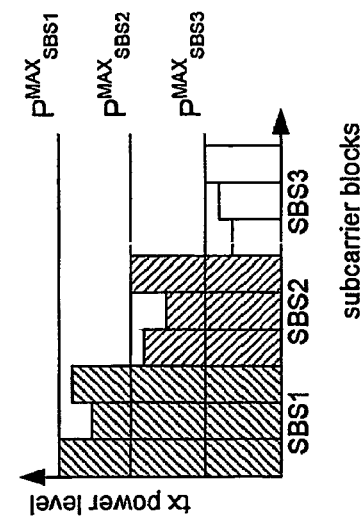
Figure 8:
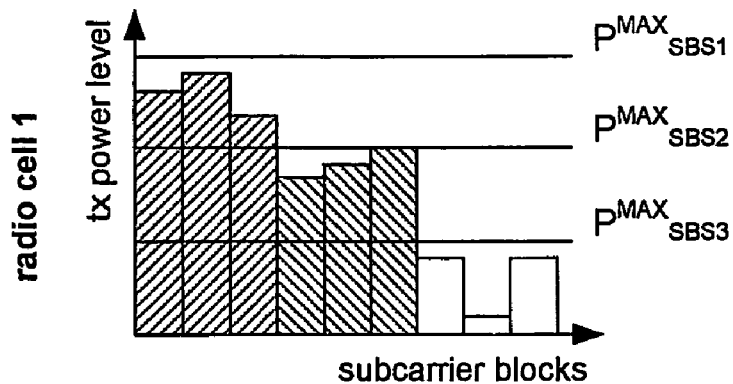
FIGS. 8, 9 & 10 show three examples for a multi-cell power range subcarrier block set configuration with equally sized subcarrier block sets according to an embodiment of the present invention.
Figure 8:
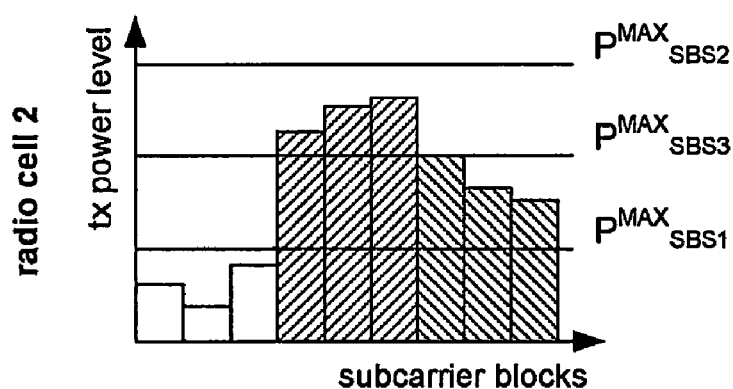
Figure 8:
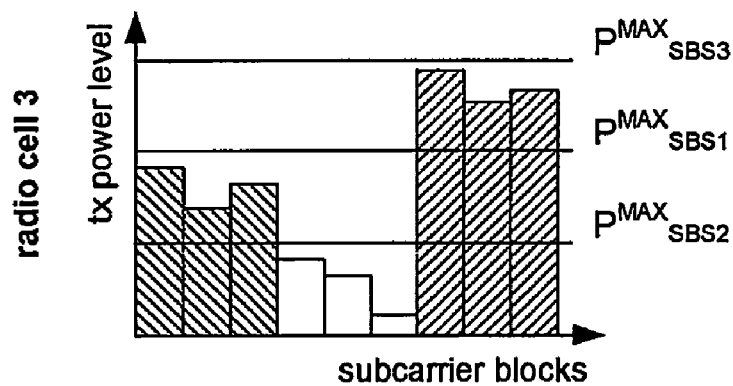
Figure 9:
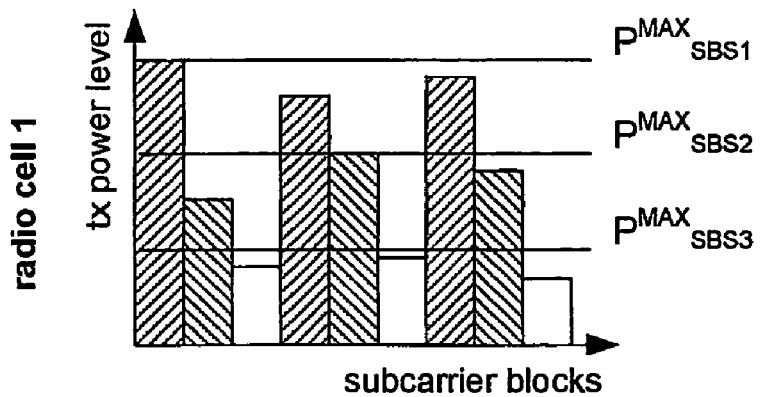
Figure 9:
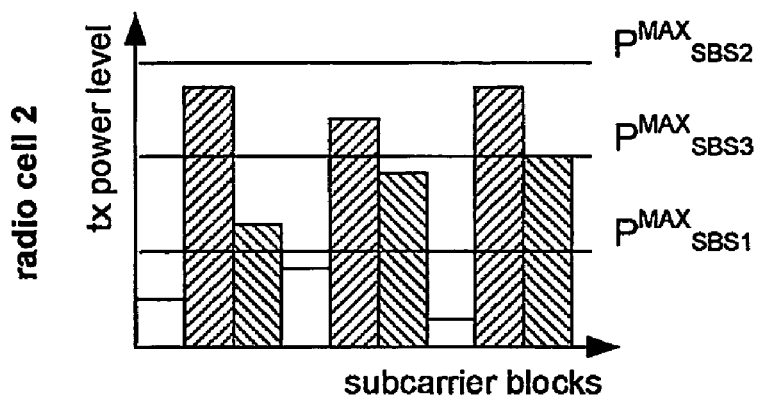
Figure 9:
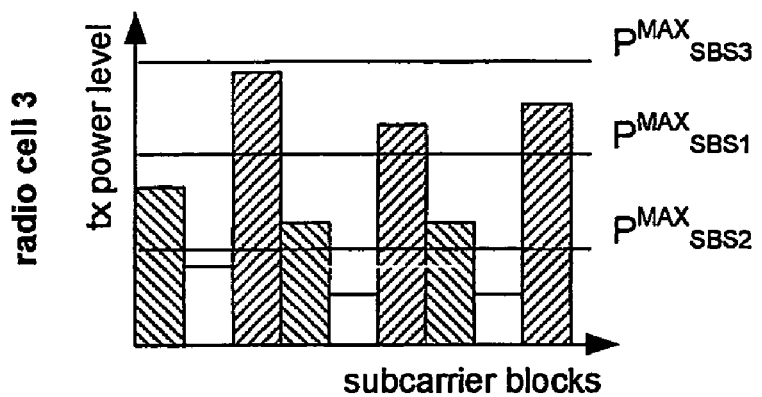
Figure 10:
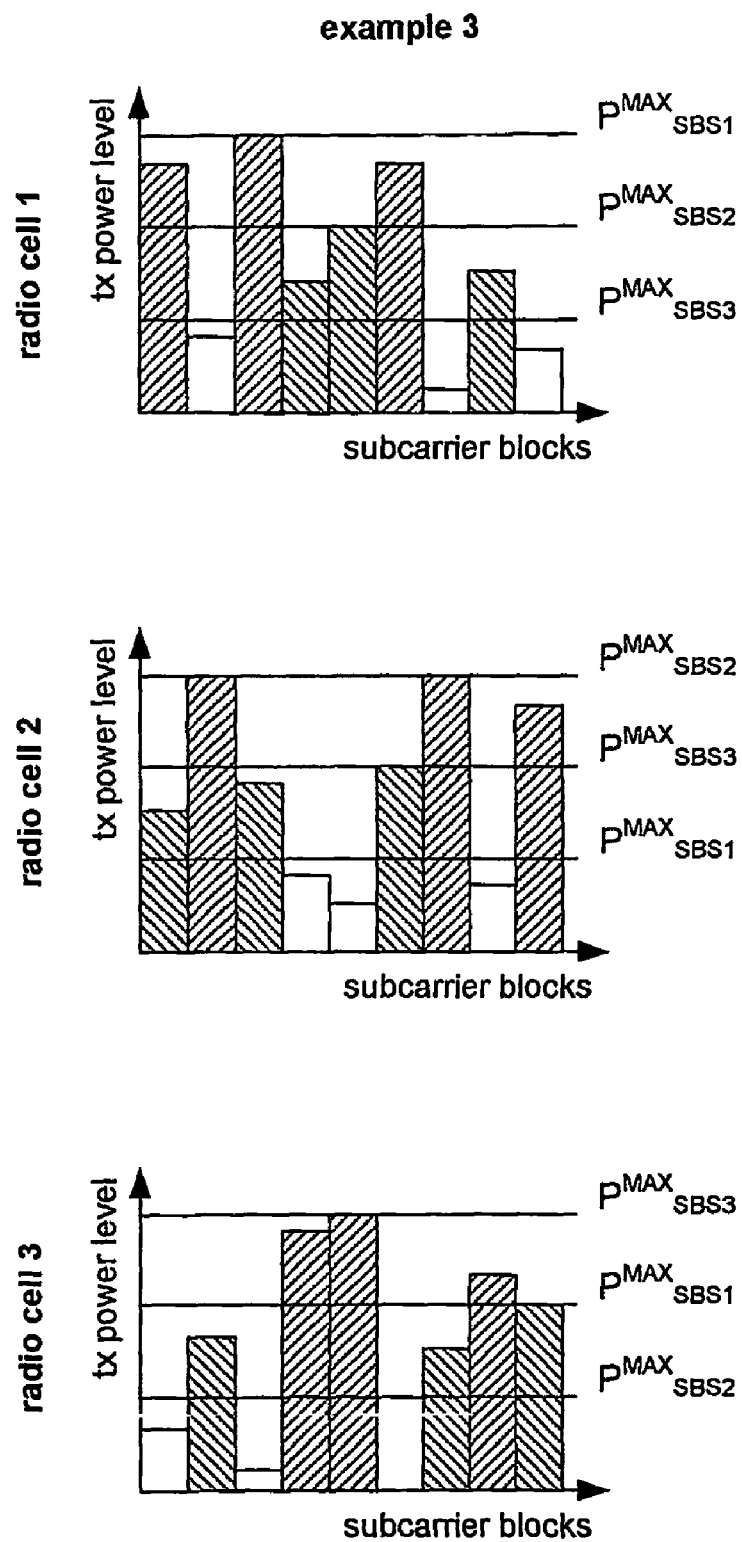

According to an embodiment of the present invention the OFDM subcarrier blocks may be divided into N subcarrier block-sets (SBS). FIG. 1 shows the distribution of transmission power for subcarrier blocks according to a prior art system. FIGS. 2, 3 and 4 show three examples for the distribution of power limits (or ranges) with different SBS definitions according to different embodiments of the present invention. The assignment of the power limits may be performed in accordance with the SBS power limits in adjacent cells in order to control the SIR levels depending on the SBS as e.g. shown in FIGS. 8, 9 and 10.

Compared to prior art, this power-limit definition has the advantage that the intercell-interference variations on subcarrier block basis are reduced, since the caused interference from a given adjacent cell cannot exceed a specific upper limit due to the SBS upper transmit power limit.

In prior art the transmit power per subcarrier block may have any value between zero and a defined maximum with the constraint that the total transmit power must not exceed the maximum allowed transmit power. FIG. 1 shows such a subcarrier-block power allocation for a power controlled system.

According to an embodiment of the present invention the subcarrier blocks may be divided into subcarrier block sets (SBS), wherein an upper limit (and possibly a lower limit) for the subcarrier block transmit power may be defined. FIGS. 2, 3, 4 show three examples of SBS definitions, wherein in the leftmost example a SBS is build from adjacent subcarrier blocks. Alternatively, a predetermined number of consecutive subcarrier blocks may be grouped into a subcarrier block set, which is assigned to a transmission power limit. The example shown in the middle associates subcarrier blocks spaced by a fixed interval to a subcarrier block set, while in the rightmost example in FIGS. 2, 3 and 4 a free distribution of subcarrier blocks into subcarrier block sets is shown. Further, it should be noted that the different subcarrier block sets of a radio cell do not necessarily comprise an equal number of subcarrier blocks as shown in the three examples.

The definition of different transmission power ranges or limits may provide the possibility to map mobile stations in low geometry to subcarrier blocks belonging to a SBS with a transmit power control range having large power levels, to map mobile stations in medium geometry to subcarrier blocks belonging to a SBS with a transmit power control range having medium power levels and to map mobile stations in high geometry to subcarrier blocks belonging to a SBS with a transmit power control range having low power levels. It is noted again, that only exemplary three transmission power ranges are used in this embodiment.

With respect to DCA and PC, different methodologies for the subcarrier assignment may be possible. PC for a given MS may be considered first and then a subcarrier block from a SBS for which the limits are not exceeded by the subcarrier block transmit power may be assigned. Alternatively, a subcarrier block and may be assigned to the MS and then the transmit power according to the allowed limits is assigned (i.e. perform the PC within the given limits).

One of the benefits of the present invention is that the created intercell interference for a given subcarrier block is upper bounded by the maximum transmit power allowed for the subcarrier block by the SBS power limit definition. This way the SIR variation may be reduced and a worst case SIR may be estimated in adjacent cells. Since in prior art any transmit power (within overall power limits) is allowed for any subcarrier, the created intercell interference varies over a large range. The SIR variation (from frame-to-frame) may be even more reduced, if also a lower power limit is defined for the subcarrier blocks.

Figure 5:
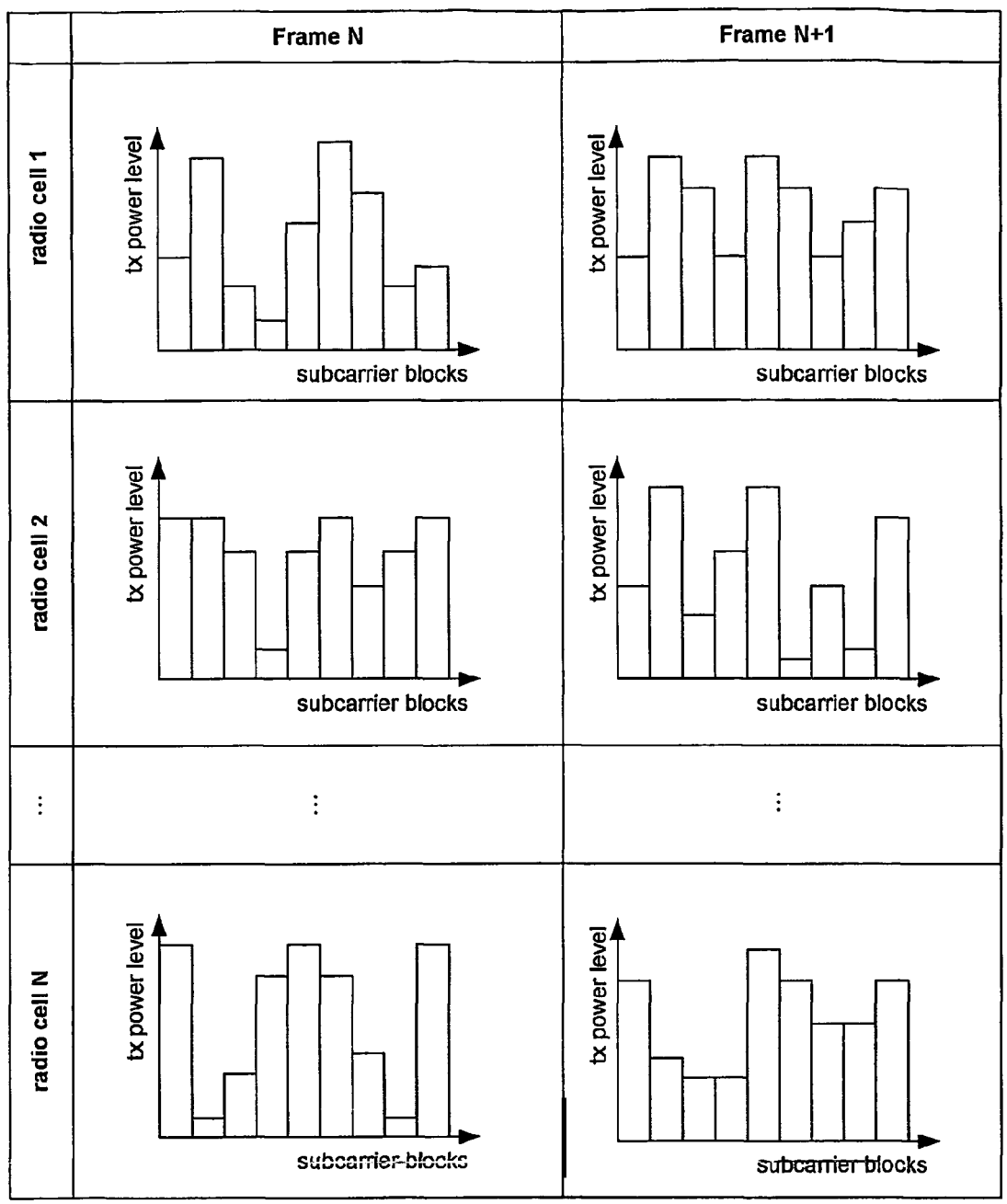
FIG. 5 shows a transmission power distribution for subcarrier blocks in adjacent cells on a frame-by-frame basis according to the prior-art.
Figure 6:
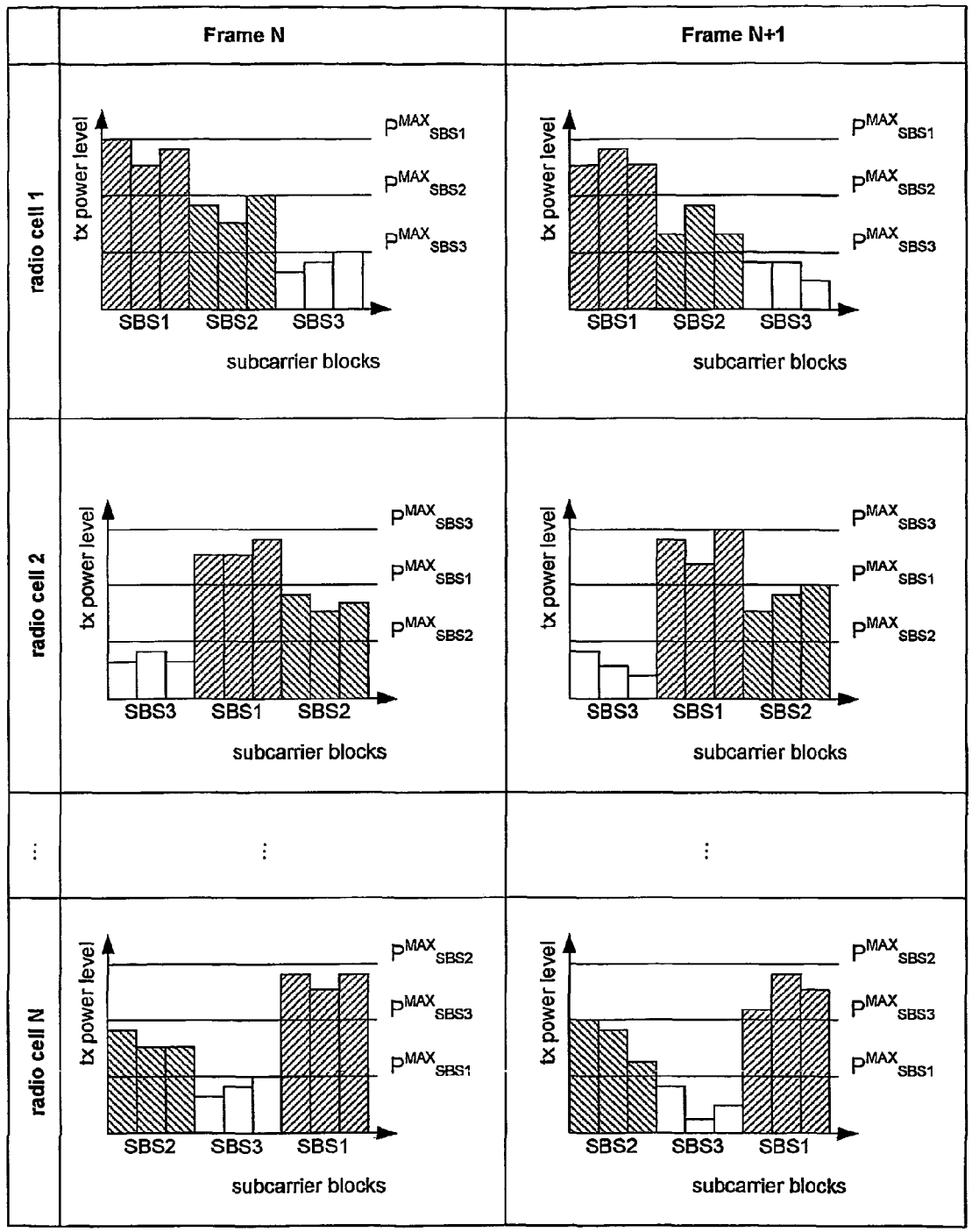
FIG. 6 shows a transmission power distribution for subcarrier blocks in, adjacent cells on a frame-by-frame basis according to an embodiment of the present invention.

FIG. 5 and FIG. 6 show an example of subcarrier block transmit power assignments of the adjacent radio cells to cell 1 ($BS_1$) (see FIG. 7) for a prior art system and for a system according to an embodiment of the present invention. Assuming, a MS is e.g. located within radio cell 1 close to radio cell 2 and radio cell 3 (MS position in the upper right of cell 1), radio cell 2 and radio cell 3 cause the main interference.

FIG. 5 indicates that the transmit power per subcarrier block in a prior art system. As apparent therefrom the intercell interference may vary significantly from frame-to-frame, since the interference caused by radio cell 2 and radio cell 3 on a given subcarrier can vary depending on the transmitted power, which can be between zero and a maximum transmit power. Since the frame-by-frame fluctuations in interference may not be known in radio cell 1, the SIR per subcarrier block may change within this large range. Hence, the DCA and AMC selection performance may be reduced significantly due to this "unknown" variation in the SIR per subcarrier block.

Considering the method proposed by the present invention, FIG. 6 shows that the transmit power per subcarrier block may only fluctuate within specified limits i.e. within a pre-defined range of transmission power control levels when performing power control for a subcarrier block. This may allow improving the accuracy of SIR estimation/prediction which may result in an improved DCA and AMC selection performance. Moreover the definition of power ranges may be performed such that e.g. a mobile station in low geometry (i.e. close to the cell boundary) will be assigned to one or multiple subcarrier block(s) belonging to a subcarrier block set having a power range of high transmit power levels. The opposite would be applies for mobile stations in high geometry.

Additionally to the division of subcarrier blocks into subcarrier block sets, the power limit definitions in adjacent radio cells may be aligned. Taking as an example the division of subcarrier blocks into subcarrier block sets as shown in FIG. 7, i.e. three subcarrier block set per radio cell, the transmission power ranges in which power control is performed may be defined according to the table below.

| Cell | SBS1 Power Ranges | | SBS2 Power Ranges | | SBS3 Power Ranges | |
|---|---|---|---|---|---|---|
| Power Limits high > medium > low | Upper Limit | Lower Limit | Upper Limit | Lower Limit | Upper Limit | Lower Limit |
| Cell 1 ($BS_1$) $P^{MAX}_{SBS1} > P^{MAX}_{SBS2} > P^{MAX}_{SBS3}$ | $P^{MAX}_{SBS1}$ (high) | $P^{MAX}_{SBS2}$ | $P^{MAX}_{SBS2}$ (medium) | $P^{MAX}_{SBS3}$ | $P^{MAX}_{SBS3}$ (low) | 0 |
| Cell 2 ($BS_2$) $P^{MAX}_{SBS2} > P^{MAX}_{SBS3} > P^{MAX}_{SBS1}$ | $P^{MAX}_{SBS1}$ (low) | 0 | $P^{MAX}_{SBS2}$ (high) | $P^{MAX}_{SBS3}$ | $P^{MAX}_{SBS3}$ (medium) | $P^{MAX}_{SBS1}$ |
| Cell 3 ($BS_3$) $P^{MAX}_{SBS3} > P^{MAX}_{SBS1} > P^{MAX}_{SBS2}$ | $P^{MAX}_{SBS1}$ (medium) | $P^{MAX}_{SBS2}$ | $P^{MAX}_{SBS2}$ (low) | 0 | $P^{MAX}_{SBS3}$ (high) | $P^{MAX}_{SBS1}$ |

Considering radio cells 1 to 3 as a cell cluster of strong interfering cells (see FIGS. 8, 9 & 10), the power limits may be coordinated such that across the considered radio cells of the cluster for each subcarrier block set a high, a medium and a low upper power limit is defined once. Regarding the inter-cell interference this may have the following effects: A subcarrier block belong to a SBS with a high power limit is interfered by subcarrier blocks with medium and low power limit, a subcarrier block belong to a SBS with a medium power limit is interfered by subcarrier blocks with high and low power limit, and a subcarrier block belong to a SBS with a low power limit is interfered by subcarrier blocks with high and medium power limit.

Figure 7:
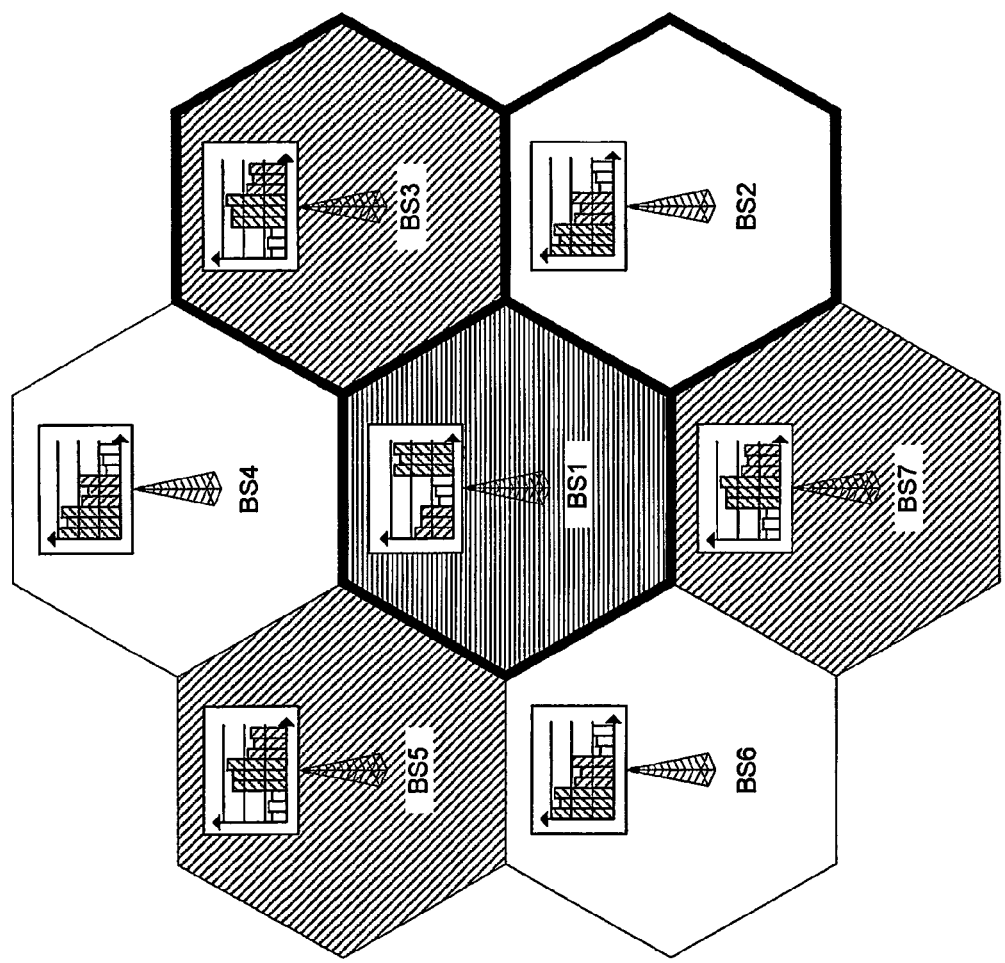
FIG. 7 shows an example for a subcarrier block set power range distribution for subcarrier blocks in adjacent cells according to an embodiment of the present invention.

Though the examples shown in FIG. 7 and also the distribution rule as defined in the table above refer to three subcarrier block sets per radio cell and three transmission power ranges, the present invention is generally applicable to any number of transmission power ranges and subcarrier block sets in a radio cell. As becomes obvious from the examples given above, certain constellation in the choice of the number of transmission power ranges and the number of subcarrier block sets may facilitate a simple assignment rule of transmission power levels to subcarrier block sets (or vice-versa).

The following matrix shows an example for the generalization of the "assignment rule" stated above, wherein $PR^n_x$ refers to a transmission power range in radio cell n having an transmission power range index x, identifying the X available different transmission power ranges per radio cell:

| | $SBS_1$ | $SBS_2$ | $SBS_3$ | ... | $SBS_{M-1}$ | $SBS_M$ |
|---|---|---|---|---|---|---|
| radio cell 1 | $PR^1_1$ | $PR^1_2$ | $PR^1_3$ | ... | $PR^1_{X-1}$ | $PR^1_X$ |
| radio cell 2 | $PR^2_X$ | $PR^2_1$ | $PR^2_2$ | ... | $PR^2_{X-2}$ | $PR^2_{X-1}$ |
| radio cell 3 | $PR^3_{X-1}$ | $PR^3_X$ | $PR^3_1$ | ... | $PR^3_{X-3}$ | $PR^3_{X-2}$ |
| ... | ... | ... | ... | ... | ... | ... |
| radio cell N − 1 | $PR^{N-1}_3$ | $PR^{N-1}_4$ | $PR^{N-1}_5$ | ... | $PR^{N-1}_1$ | $PR^{N-1}_2$ |
| radio cell N | $PR^N_2$ | $PR^N_3$ | $PR^N_4$ | ... | $PR^N_X$ | $PR^N_1$ |

In the table above, the power ranges $PR^n_x$ of an power range index x may vary between different radio cells or may represent the same power range. Important to note is that in the given example the index x=1 refers to the power range $PR^n_x$ in radio cell n having the lowest transmission power levels available for power control, while x=X refers to the power range $PR^n_x$ in radio cell n having the largest transmission power levels available for power control. Moreover, $PR^n_x \leq PR^n_{n-1}$ is valid for all x. The distribution of the power ranges among different cells may be achieved by a permutation of the index x indicating the strengths of power levels i.e. the transmission power level range of a signal emitted by a base station of radio cell n. As can be further seen in the table, each of the power range indices $x \in \{1, 2, 3, \ldots, X\}$ occurs once in each column and each row of the matrix. Hence, in the example shown, the number of subcarrier block sets M equals the numbers of transmission power ranges X. Also the number of radio cells in a cluster N is the same as the number of subcarrier block sets M or transmission power ranges X respectively. Note, that a possible embodiment allows $PR^n_x = PR^n_{x-1}$, which essentially means that in the respective cell $SBS_m$ and $SBS_{m+1}$ can have an identical transmit power range. Naturally, this may only be valid for selected subcarrier block sets. This embodiment may be considered similar to the case when having less power ranges than subcarrier block sets for a given cell and a single power range is used for multiple subcarrier block sets.

In case M>X, more than one subcarrier block set may be assigned to a single transmission power range. Also in case N≠M, i.e. the number of radio cells in a cluster and the number of subcarrier block sets is not equal, a distribution rule may follow the rule as stated above, i.e. that each row and column in the matrix may only comprise each of the power range indices x once.

When choosing the number of transmission power ranges and subcarrier block sets equal to a multiple of the number of cells in a cell cluster, a simple distribution rule may be defined. In case the number of subcarrier block sets and the number of transmission power ranges per radio cell are also equal, a simple mapping scheme as outlined above may be used.

FIG. 7 further shows that the subcarrier block set alignment according to this method may be extended to a multicell scenario while keeping the denoted interference properties.

The proposed subcarrier block set multicell alignment may have the following effects/benefits. The SIR for MS in low geometries may be reduced, since they are preferably assigned to subcarrier blocks belonging to subcarrier block sets with high transmit power i.e. having an associated transmission power range comprising large transmit powers, which experience less interference e.g. by medium and low power subcarrier blocks. The SIR for MS in high geometries may be increased, since they are preferably assigned to subcarrier block belonging to SBS with low transmit power, which experience increased interference e.g. by high and low medium subcarrier blocks. Employing the principles of the present invention as outlined, the required dynamic range for the transmit power control may be decreased.

According to a further embodiment of the present invention, the lower power limits ($P^{MIN}$) are equal to the upper limits ($P^{MAX}$) of the "next stronger" subcarrier block set, i.e. for $P^{MAX}_{SBS\_1} \geq P^{MAX}_{SBS\_2} \geq P^{MAX}_{SBS\_3} \geq \ldots$ then $P^{MIN}_{SBS\_1} = P^{MAX}_{SBS\_2}$, $P^{MIN}_{SBS\_2} = P^{MAX}_{SBS\_3} \ldots$ a.s.o.

According to a further embodiment of the present invention, the lower power limits ($P^{MIN}$) are smaller (e.g. by a defined offset) than the upper limits ($P^{MAX}$) of the next subcarrier block set, i.e. for $P^{MAX}_{SBS\ 1} \geqq P^{MAX}_{SBS\ 2} \geqq P^{MAX}_{SBS\ 3} \geqq$ . . . a.s.o. then $P^{MIN}_{SBS\ 1} = P^{MAX}_{SBS\ 2}$, $P^{MIN}_{SBS\ 2} = P^{MAX}_{SBS\ 3}$ . . . a.s.o.

According to another embodiment, a MS in low geometry may be assigned to high power subcarrier block sets and vice versa. I.e. a communication terminal is assigned a radio channel (one or multiple subcarrier block(s) of a subcarrier block set) based on its geometry. It should be noted that in a real (non-ideal hexagonal) deployment and environment the term geometry does not necessarily solely depend on the MS-BS distance (MS distance to the cell center), but it refers more to the signal path loss. I.e. a MS can be very close to the BS, but have a low average SIR, since the signal path it is shadowed by a building and the interference path(s) is(are) LOS (line-of-sight).

A subcarrier block as used in the previous sections may comprise M subcarriers, where M may also be 1. I.e. in case of M=1 the system would be "reduced" to a FDM system.

A subcarrier block-set (SBS) can contain S subcarrier blocks, where S can vary depending on the defined SBS, however preferably the same subcarrier blocks should be used for respective SBSs in adjacent cells A subcarrier block-set (SBS) may contain S subcarrier blocks, where S can vary depending on the defined SBS. However, according to another embodiment of the present invention, the same subcarrier blocks may be used for respective SBSs in adjacent cells. In the latter case, for each of the subcarrier block sets in each radio cell of a cell cluster there may exist a corresponding subcarrier block set in an adjacent radio cell correspond in that the same subcarriers are assigned to the corresponding subcarrier block sets.

Further, the SBS power limits may vary depending on the radio cell. For x defined SBSs, up to x−1 SBSs may have the same power limit. The power limits may be reconfigured for each cell individually or in accordance with adjacent radio cells.

Another aspect of the present invention is related to the signaling related to the (re)configuration of subcarrier block sets in the radio cells and the transmission power ranges or limits. Since a reconfiguration in a radio cell may be coordinated with adjacent the cell's radio cells, it may be necessary to signal information related to the reconfiguration to the adjacent cells.

For example information relating to the channel quality, i.e. interference levels in a radio cell may be signaled to the neighboring radio cells in order to enable same to use this information when considering a reconfiguration of their power levels used. Also when the grouping of subcarrier blocks into subcarrier block sets has to be changed, the new distribution or mapping of subcarrier blocks to subcarrier block sets have to be signaled to the adjacent cells, as those may use the same mapping in the respective cell.

Depending on the network architecture this information may also be transmitted to a supervising unit (e.g. radio network controller) controlling a cell cluster and may utilize respective information in order to initiate a (re)configuration.

According to a further embodiment of the present invention, another aspect of the invention is the signaling related to the communication between transmitter and receiver. The signaling between the transmitter and the receiver may comprise the signaling of a subcarrier block set assignment and a subcarrier block assignment. Before an actual frequent (frame-by-frame) assignment of the subcarrier block, there may be a relatively less frequent pre-assignment of a mobile station to a subcarrier block set, which may basically define an "active" subcarrier block set for the respective mobile station.

This may allow to reduce the signaling overhead for the subcarrier block assignment, since the signaling has only be performed with respect to the subcarrier block set to which the mobile station is pre-assigned. Moreover, it may allow reducing the signaling overhead for the channel quality feedback signaling from receiver to transmitter, which may be carried out only for the respective subcarrier block set.

Figure 11:
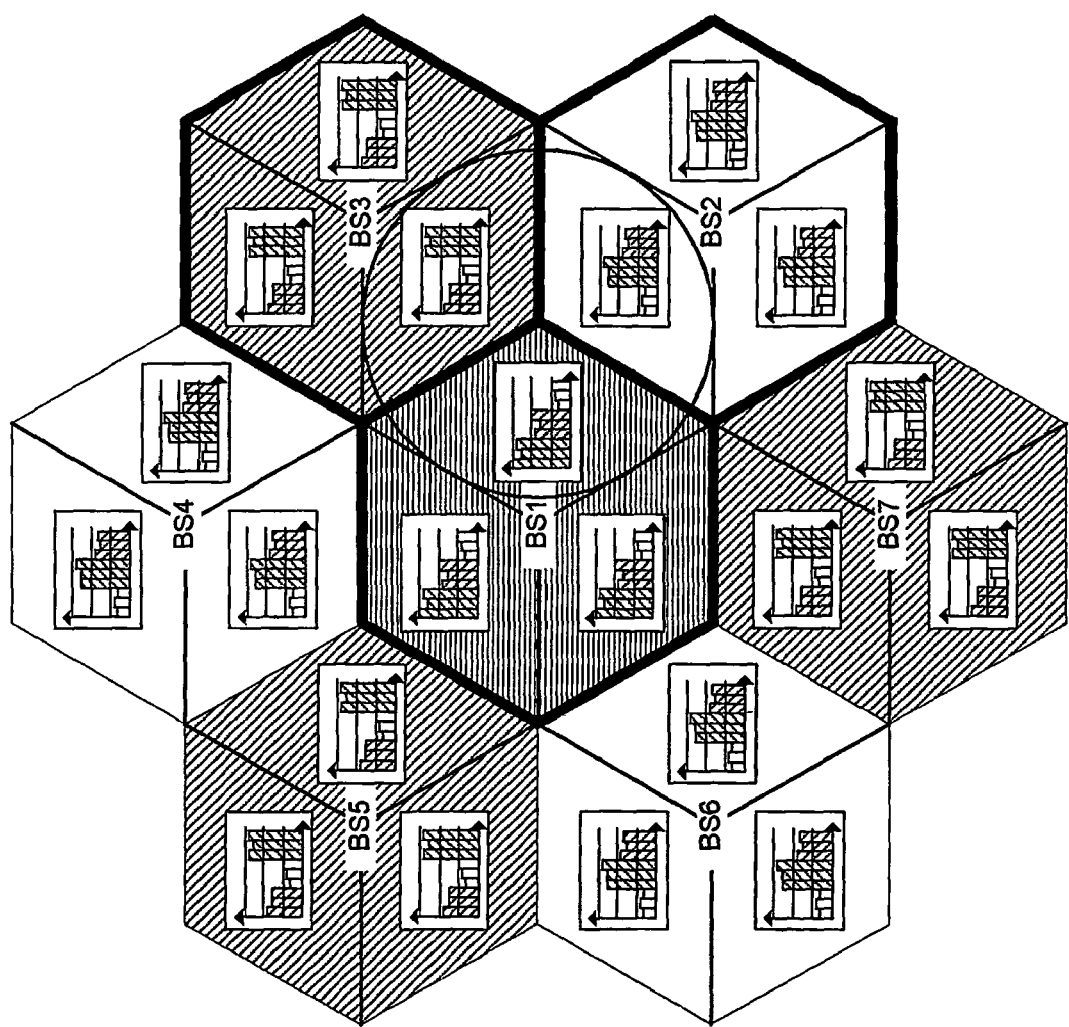
FIG. 11 shows an example for a subcarrier block set power range allocation pattern in adjacent radio cells each divided in a plurality of sectors according to an embodiment of the present invention.
Figure 12:
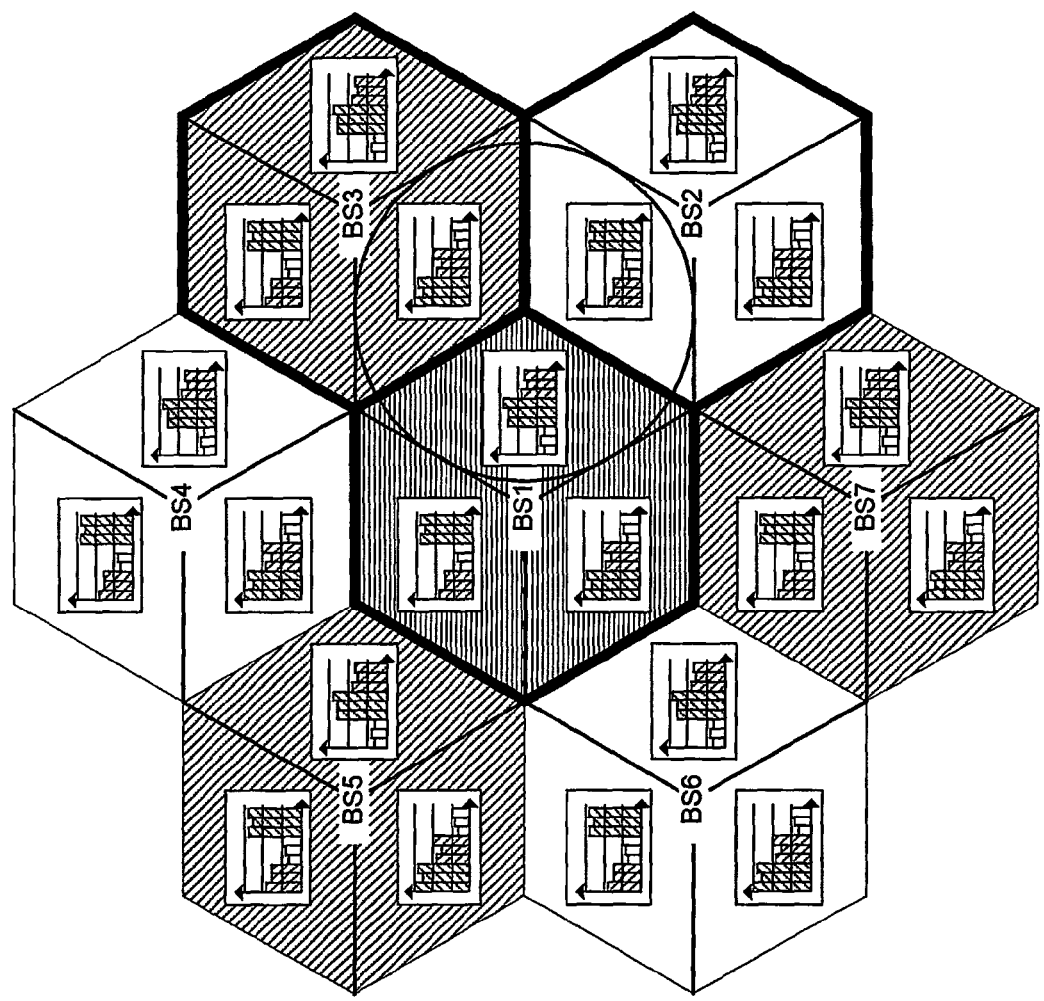
FIG. 12 shows another example for a subcarrier block set power range allocation pattern in adjacent radio cells each divided in a plurality of sectors according to an embodiment of the present invention.

Further, it is noted that the ideas underlying the present invention may be applied to any cell layout. According to another embodiment of the present invention, sectorized radio cell may be used. An example for a hexagonal radio cell layout with 3 sectors per cell is shown in FIGS. 11 and 12. It may be assumed that the antenna patterns of the sectors within a radio cell interfere with each other in a neglectable manner (i.e. antenna beam width $\leqq 120°$). In this case the interference of sectors of adjacent cells (within the antenna beam width) may be dominating. As shown in FIG. 11, for sector 2 of radio cell 1 ($BS_1$) there exist two adjacent sectors in adjacent radio cells, namely sector 2 in radio cell 3 ($BS_3$) and sector 3 in radio cell 2 ($BS_2$). These three adjacent sectors in the different radio cells may also be considered as a sector cluster.

In each of the sectors shown in a single radio cell, the same subcarrier blocks (i.e. subcarriers) may be simultaneously used. For balancing the interference the methods as proposed above for the use of single beam antennas may be employed. The method is only adopted to the new cell layout in that instead of performing interference balancing on radio cells of a cell cluster, the interference between sectors of a sector cluster is balanced.

When comparing FIG. 11 to FIG. 7, it is noted that the same choice of the number of transmission power ranges and subcarrier block sets and a similar mapping between power ranges and subcarrier block sets may be employed. As illustrated in FIG. 11, the same power range-subcarrier block set combinations may be used within the sectors of a radio cell. Hence, the "pattern" of coordinated power range-subcarrier block set combinations among sectors belonging to a sector cluster may correspond to same known from FIG. 11 for coordinated power range-subcarrier block set combinations for a radio cell cluster. However, in case of employing sectorized radio cells, the power ranges chosen in the sectors of a single radio cell may differ from each other.

Further, the transmission power ranges and subcarrier block sets within a sector may be reconfigured as described above. The signaling that may be necessary to inform adjacent radio cells on the reconfiguration of a sector may be transmitted to the base stations providing the antenna beam of adjacent sectors of a sector cluster. Depending on the network architecture this may be performed directly or via control unit in the communication system, e.g. an Radio Network Controller (RNC).

Another example for a possible power range-subcarrier block set combination is illustrated in FIG. 12. In this embodiment of the present invention, the sectors of a single radio cell do not use the same power range-subcarrier block set combination, as in the example of FIG. 11. The resulting "pattern" of coordinated power range-subcarrier block set combinations considered on a sector basis is similar to the one shown in FIG. 7. This means that a sector in FIG. 12 corresponds to a radio cell in FIG. 7 to abstain from the fact that more than one sector is controlled by a base station of a radio cell.

The proposed method can also be applied to MC-CDMA systems. Here, the transmit power limits for a given SBS should be defined for the sum of the power-per-code for a given (sub)carrier-(block). Such a MC-CDMA system may employ spreading in time and/or frequency domain.

Further, it is noted that the principles underlying the present invention may be applicable to communication on the downlink and/or the uplink of a communication system.

The invention claimed is:

1. A method for balancing the distribution of interference between radio cells in a wireless communication system, the wireless communication system comprising a plurality of radio cells in which a plurality of subcarrier blocks are used for communication, wherein a number of adjacent radio cells build a cell cluster, wherein the radio cells of the cell cluster each comprise corresponding subcarrier block sets having the same subcarrier blocks, and wherein each subcarrier block comprises a plurality of subcarriers, the method comprising:

grouping said subcarrier blocks into a plurality of subcarrier block sets in each radio cell of the cell cluster, determining a plurality of transmission power ranges for each of the radio cells of said cell cluster, wherein a respective transmission power range defines a range of transmission power levels used for transmission power control within a respective radio cell of the cell cluster, assigning the plurality of transmission power ranges to the subcarrier block sets of radio cells of the cell cluster, such that:

in each radio cell of the cell cluster, each of said plurality of transmission power ranges is mapped to one of the subcarrier block sets of a respective radio cell, and each of said plurality of transmission power ranges is mapped to one of said corresponding subcarrier block sets among the radio cells of said cell cluster.

2. The method according to claim 1, wherein the mapping is a unique or one-to-one mapping.

3. A method for balancing the distribution of interference between radio cells in a wireless communication system, the wireless communication system comprising a plurality of radio cells in which a plurality of subcarrier blocks are used for communication, wherein N adjacent radio cells build a cell cluster, wherein the N radio cells of the cell cluster each comprise corresponding subcarrier block sets having the same subcarrier blocks, and wherein each subcarrier block comprises a plurality of subcarriers, N being an integer number of 2 or more, the method comprising:

grouping said subcarrier blocks into N subcarrier block sets in each radio cell of the cell cluster, determining N transmission power ranges for each of the radio cells of said cell cluster, wherein a respective transmission power range defines a range of transmission power levels used for transmission power control within a respective radio cell of the cell cluster, assigning N transmission power ranges to the N subcarrier block sets of radio cells of the cell cluster, such that in each of the N radio cells of the cell cluster, each of said N transmission power ranges is mapped to one of the N subcarrier block sets of a respective radio cell, and each of said N transmission power ranges is mapped to one of said corresponding subcarrier block sets among the N radio cells of said cell cluster.

4. A method for balancing the distribution of interference between radio cells in a wireless communication system, the wireless communication system comprising a plurality of radio cells each of them comprising at least two sectors in each of which a plurality of subcarrier blocks are used for communication, wherein a sector of a radio cell and its adjacent sectors in neighboring radio cells build a sector cluster, wherein the sector cluster comprises corresponding subcarrier block sets having the same subcarrier blocks, and wherein each subcarrier block comprises a plurality of subcarriers, the method comprising:

grouping said subcarrier blocks into a plurality of subcarrier block sets in each of the sectors of the sector cluster, determining a plurality of transmission power ranges for each sector of the sector cluster, wherein a respective transmission power range defines a range of transmission power levels used for transmission power control within a respective sector of the sector cluster, assigning the plurality of transmission power ranges to the plurality of subcarrier block sets of a sector of a radio cell and its adjacent sectors of said other radio cells, wherein said plurality of transmission power ranges is assigned to the subcarrier block sets of the sector cluster, such that in each sector of a sector cluster, each of said plurality of transmission power ranges is mapped to one of said subcarrier block sets of a respective sector, and each of said plurality of transmission power ranges is mapped to one of said corresponding subcarrier block sets in the sector cluster.

5. The method according to claim 4, wherein the mapping is a unique or one-to-one mapping.

6. The method according to claim 1, wherein the communication system comprises a plurality of communication terminals communicating with base stations associated with said plurality of adjacent radio cells of the cell cluster, the method further comprising:

measuring the path loss of a communication signal of a communication terminal and the path loss of interference from adjacent radio cells of the cell cluster for said communication signal, and assigning the communication terminal to a subcarrier block of a subcarrier block set in a radio cell of the cell cluster other than the adjacent radio cells based on said measurement.

7. The method according to claim 6, further comprising determining a transmission power range for said communication terminal based on said measurement, and wherein the communication terminal is assigned to a block set based on the determined transmission power range.

8. The method according to claim 1, wherein the transmission power ranges in different radio cells of the cell cluster vary.

9. The method according to claim 1, wherein the subcarrier block set size of corresponding subcarrier block sets is equal.

10. The method according to claim 1, further comprising reconfiguring the subcarrier block sets in a radio cell of the cell cluster.

11. The method according to claim 1, further comprising reconfiguring the transmission power ranges in a radio cell of the cell cluster.

12. The method according to claim 11, wherein the reconfiguration of the subcarrier block sets in the radio cell of the cell cluster is performed in accordance with the other adjacent radio cells of the cell cluster.

13. The method according to claim 10, wherein the reconfiguration of the power ranges and/or the subcarrier block sets in the sector is performed in accordance with the other sectors of its sector cluster.

14. The method according to claim 10, wherein the reconfiguration is based on channel quality measurements.

15. The method according to claim 1, further comprising signaling information related to a reconfiguration of the subcarrier block sets in a radio cell from the radio cell to at least one adjacent radio cell within the cell cluster.

16. The method according to claim 11, further comprising signaling information related to channel qualities in a radio cell of the cell cluster from said radio cell to at least one other adjacent radio cell within the cell cluster.

17. The method according to claim 15, further comprising signaling the information to a control unit in the communication system.

18. The method according to claim 6, further comprising signaling information related to a subcarrier block assignment and/or a subcarrier block set assignment to a communication terminal.

19. A base station for use in a wireless communication system, the wireless communication system comprising a plurality of radio cells in which a plurality of subcarrier blocks are used for communication, wherein a number of adjacent radio cells build a cell cluster, wherein the radio cells of the cell cluster each comprise corresponding subcarrier block sets having the same subcarrier blocks, and wherein each subcarrier block comprises a plurality of subcarriers, the base station controlling one of the radio cells of the cell cluster and comprising:
- a processing unit operable to group said subcarrier blocks into a plurality of subcarrier block sets in the radio cell of the cell cluster controlled by the base station,
- a determination unit operable to determine a plurality of transmission power ranges for the radio cell of the cell cluster controlled by the base station,
- a power control unit operable to perform power control within a range of transmission power levels defined by a respective one of said plurality of transmission power ranges,
- an assigning unit operable to assign the plurality transmission power ranges to the subcarrier block sets of the radio cells of the cell cluster controlled by the base station, such that
- in each radio cell of the cell cluster, each of said plurality of transmission power ranges is mapped to one of the subcarrier block sets of a respective radio cell, and
- each of said plurality of transmission power ranges is mapped to one of said corresponding subcarrier block sets among the radio cells of said cell cluster.

20. A base station in a wireless communication system, the wireless communication system comprising a plurality of radio cells in which a plurality of subcarrier blocks are used for communication, wherein N adjacent radio cells build a cell cluster, wherein the N radio cells of the cell cluster each comprise corresponding subcarrier block sets having the same subcarrier blocks, and wherein each subcarrier block comprises a plurality of subcarriers, N being an integer number of 2 or more, the base station controlling one of the radio cells of the cluster and comprising:
- a processing unit operable to group said subcarrier blocks into N subcarrier block sets in the radio cell controlled by the base station,
- a determination unit operable to determine N transmission power ranges for the radio cell of the cell cluster controlled by the base station,
- a power control unit operable to perform power control within a range of transmission power levels defined by a respective one of said plurality of transmission power ranges,
- an assigning unit operable to assign N transmission power ranges to the N subcarrier block sets of the radio cells of the cell cluster controlled by the base station, such that
- in each of the N radio cells of the cell cluster, each of said N transmission power ranges is mapped to one of the N subcarrier block sets of a respective radio cell, and
- each of said N transmission power ranges is mapped to one of said corresponding subcarrier block sets among the N radio cells of said cell cluster.

21. A base station for use in a wireless communication system, the wireless communication system comprising a plurality of radio cells each of them comprising at least two sectors in each of which a plurality of subcarrier blocks are used for communication, wherein a sector of a radio cell and its adjacent sectors in neighboring radio cells build a sector cluster, wherein the sector cluster comprises corresponding subcarrier block sets having the same subcarrier blocks, and wherein each subcarrier block comprises a plurality of subcarriers, the base station controlling a radio cell having a sector of the sector cluster and comprising:
- a processing unit operable to group said subcarrier blocks into a plurality of subcarrier block sets in the sector of the sector cluster controlled by the base station,
- a determination unit operable to determine a plurality of transmission power ranges for the sector of the sector cluster controlled by the base station,
- a power control unit operable to perform power control within a range of transmission power levels defined by a respective one of said plurality of transmission power ranges,
- an assigning unit operable to assign the transmission power ranges to the subcarrier block sets of the sector of the sector cluster controlled by the base station, such that
- in each sector of a sector cluster, each of said plurality of transmission power ranges is mapped to one of said subcarrier block sets of a respective sector, and
- each of said plurality of transmission power ranges is mapped to one of said corresponding subcarrier block sets in the sector cluster.

22. The base station according to claims 20, further comprising:
- a measuring unit operable to measure the path loss of a communication signal of a communication terminal and the path loss due to interference among the N adjacent radio cells of the cell cluster for said communication signal, and
- the assigning unit is operable to assign the communication terminal to one of said subcarrier block sets based on said measurements.

23. A radio communication system comprising a base station according to claim 19 and a communication terminal in a wireless communication system, the wireless communication system comprising a plurality of radio cells in which a plurality of subcarrier blocks are used for communication, wherein each subcarrier block comprises a plurality of subcarriers, the communication terminal comprising a power control unit operable to perform power control between a base station of a radio cell communicating with the communication terminal, wherein the power control unit is operable to perform power control in a transmission power control range in an interval defined by a transmission power level of 0 and a maximum transmission power level.

24. The method according to claim 4, wherein the transmission power ranges in different sectors of the sector cluster vary.

25. The method according to claim 4, further comprising reconfiguring the subcarrier block sets in a sector of the sector cluster.

26. The method according to claim 4, further comprising reconfiguring the transmission power ranges in a sector of the sector cluster.

27. The method according to claim 4, wherein the subcarrier block set size of corresponding subcarrier block sets is equal.

28. A communication terminal in a wireless communication system, the wireless communication system comprising a plurality of radio cells in which a plurality of subcarrier blocks are used for communication, wherein a number of adjacent radio cells build a cell cluster, wherein the radio cells of the cell cluster each comprises corresponding subcarrier block sets having the same subcarrier blocks, and wherein each subcarrier block comprises a plurality of subcarriers, wherein the communication terminal is communicating in one of the radio cells of the cell cluster and comprising:

- a power control unit that performs power control of the data transmitted to a base station controlling the radio cell by the communication terminal, wherein the power control unit performs power control within a given one of plural transmission power control ranges, wherein each transmission power control range is associated to one of the subcarrier block sets in the radio cell,
- a receiving unit that receives an allocation of a subcarrier block assignment or a subcarrier block set, and
- a selection unit that transmits data to the base station on the assigned subcarrier block or assigned subcarrier block set, wherein
- the transmit power control unit performs power control of the transmitted data within the transmit power control range associated to the subcarrier block set to which the assigned subcarrier block belongs, respectively associated to the assigned subcarrier block set.

* * * * *